Dec. 15, 1964 C. W. GERHARDT 3,161,042
METHOD AND APPARATUS FOR MEASURING CORROSION RATES
Original Filed June 9, 1955

INVENTOR.
CARL W. GERHARDT
BY *Wade Lowry*
*Arsen Tashjian*
ATTORNEYS

United States Patent Office 3,161,042
Patented Dec. 15, 1964

3,161,042
METHOD AND APPARATUS FOR MEASURING CORROSION RATES
Carl W. Gerhardt, 2945 Dryden Road, Dayton 39, Ohio
Application Sept. 7, 1960, Ser. No. 54,553, now Patent No. 3,112,641, dated Dec. 3, 1963, which is a division of application Ser. No. 514,408, June 9, 1955, now Patent No. 2,972,248, dated Feb. 21, 1961. Divided and this application June 25, 1963, Ser. No. 290,568
2 Claims. (Cl. 73—86)
(Granted under Title 35, U.S. Code (1952), sec. 266)

The invention described herein may be manufactured and used by or for the United States Government for governmental purposes without payment to me if any royalty thereon.

This invention is a division of my copending application Serial Number 54,553 filed September 7, 1960, now Patent No. 3,112,641 which, in turn, is a division of application Serial Number 514,408, filed June 9, 1955 and matured into United States Patent Number 2,972,248. The invention relates to an apparatus for measuring the corrosivity of an atmosphere or environment or for measuring the corrodibility of a resilient member such as a spring and could also be used to measure erosive rates.

The conventional method to measure corrosivity of an environment or the corrodibility of material is to prepare a test sample or samples, put them in a corrosive environment and measure the loss in weight of the samples after a fixed period of time. Such a method requires an extremely accurate balance and it has been necessary to run a large number of samples averaging results to make any reasonably accurate estimation of corrosiveness. There seem to be a number of factors that influence the accuracy of this method including the original preparation of the samples and the handling and preparation of the samples after exposure prior to weighing.

It is an object of this invention to provide an improved apparatus for testing corrosion rates wherein a measurement is made indicative of the change of strength of a resilient member with time as an indication of corrosion rate.

It is another object of this invention to provide an improved apparatus for measuring the corrosivity of an environment or an atmosphere wherein such information is obtained from a measurement indicative of the change of strength with time of the resilient member.

It is a further object of this invention to provide an improved apparatus for measuring the corrosion rate of a resilient material such as a spring wherein such information is obtained from a measurement indicative of the change of strength of the resilient member.

It is yet another object of this invention to provide an improved method and apparatus for testing erosion rates wherein a measurement is made indicative of the change of strength of a resilient member with time as an indication of the erosion rate.

These and other objects of the invention will become apparent as the detailed description of the invention proceeds.

The invention will be more clearly understood from the following detailed description of specific examples thereof read in conjunction with the accompanying drawing wherein.

Figure 1:
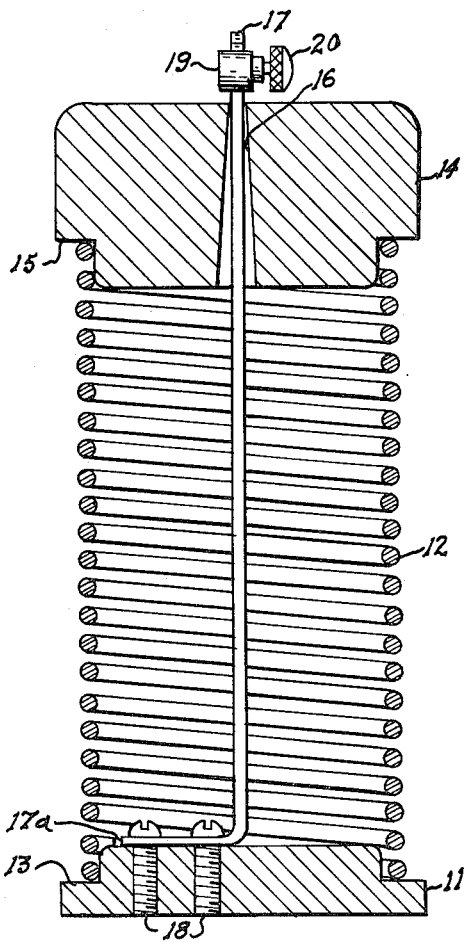
FIGURE 1 is a sectional elevational view of one embodiment of my invention.
Figure 1A:
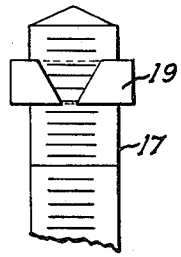
FIGURE 1a is a partial elevational view of the scale and zero adjust means of the embodiment of FIGURE 1.

FIGURE 1 shows a first embodiment of the apparatus of my invention. A frame 11 having a peripheral notch 13 in the top surface thereof acts as a support for the apparatus. A helical spring 12 is positioned in notch 13. Weight 14 having a peripheral notch 15 in the bottom surface thereof and an axial passage 16 therethrough is positioned on spring 12 to act as a compressive force on the spring. The spring is positioned in notch 15 of the weight. For the purpose of indicating the change in position of weight 14 a scale 17, which is L-shaped and has a bottom portion 17a as a part thereof, is attached by screws 18 or other suitable means to frame 11. This scale projects axially up through spring 12 and through passage 16 in weight 14. A zero adjust collar 19 having a set screw 20 is positioned on scale 17. Collar 19 is a split ring cylinder as shown in FIGURE 1a. This arrangement facilitates the reading of the zero point.

Obviously the scale 17 need not be a part of the apparatus itself. A separate scale could be used to make the measurements. However, for convenience and accuracy it is preferred to use an attached scale. Also the zero adjust means (19 and 20) could be eliminated from the apparatus, but for convenience and accuracy it is preferred to have the zero adjust means as a part of the apparatus.

The apparatus of FIGURE 1 when used is placed in the particular environment to which it is to be exposed. The zero adjust collar 19 is positioned with its bottom portion touching the top of weight 14. A reading is then made of this zero position on the scale. A number of days or weeks or months are allowed to pass and a reading is made of the scale distance between the zero adjust collar 19 and the weight 14. These readings are normally made at spaced intervals from time to time. Data obtained from these readings may be plotted in a manner similar to that shown in FIGURE 3. A curve somewhat similar to that shown in FIGURE 3 will be obtained. This curve is indicative of the corrosiveness of the particular environment or atmosphere in which the apparatus has been placed and of the corrodibility of spring 12. Obviously the apparatus may be used to test either the environment or the spring. The spring must be made of material which will show a measurable change in compressive strength with time in the test. Normally some sort of nonstainless steel would probably be used for the spring.

Figure 2:
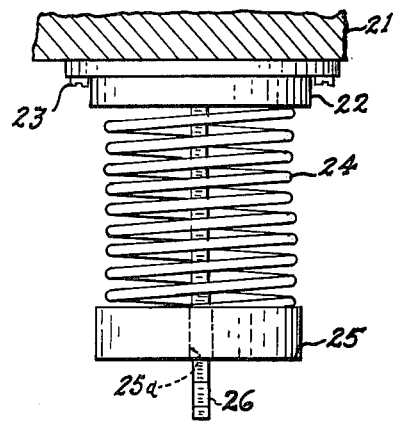
FIGURE 2 is an elevational view of another embodiment of my invention.

FIGURE 2 shows another embodiment of my invention which is really the same embodiment as is described in FIGURE 1 except that the helical spring is in tension rather than compression as in FIGURE 1. This embodiment is supported from an overhead support 21. Frame 22 is attached by screws 23 or other suitable means to support 21. A helical spring 24 is rigidly attached to frame 22 by welding, brazing or other suitable means. Spring 24 could be attached to frame 22 by screwing the spring into a threaded channel (not shown) in frame 22. A weight 25 is rigidly attached to the lower end of spring 24. This weight may be attached to the spring in the same manner as the spring is attached to the frame. Weight 25 has an axial channel 25a therethrough for accommodating scale 26 which is rigidly attached to frame 22 by welding, brazing or other suitable means. As shown, scale 26 projects axially through spring 24 and weight 25.

The apparatus of FIGURE 2 would be used in a method similar to that described in which the apparatus of FIGURE 1 was used except that the readings in this case would be taken from the bottom of weight 25 on scale 26 and no zero adjust means would be used in this case. A reading would be taken at zero exposure time of the apparatus and at spaced time intervals during the exposure. A separate scale, i.e., not a part of the apparatus, may be used for measurements but the attached scale is preferred for convenience. In this case the change in tensile strength rather than compressive strength of the spring would be indicated. It is preferred though not absolutely necessary that all other parts except the springs of the apparatus of both FIGURES 1 and 2 be made of a noncorrosive material for appearance sake, or these parts might be coated with some protective coating.

Figure 3:
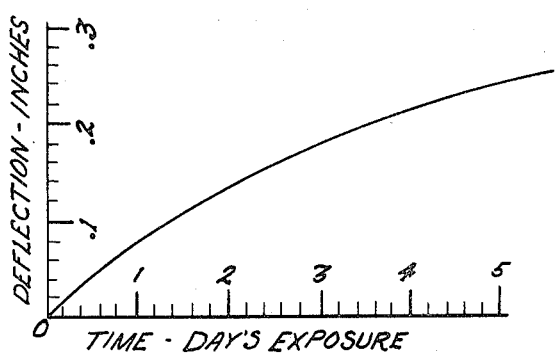
FIGURE 3 is a typical graphical presentation of the data obtained from an embodiment of my invention such as is shown in FIGURE 1.

As has been previously mentioned FIGURE 3 shows a typical plot of data which might be obtained from the apparatus.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. For example, the various apparatus embodiments of the invention can be used in the determination of erosive rates as well as corrosive rates, i.e., to determine the erosiveness of an environment or atmosphere or the erodibility of a resilient member. The resilient member would be made of suitable erodible material for measuring the erosiveness of an atmosphere or environment, and in many cases this material could be the same material as would be used for corrosive rate measurements. The fact that a resilient member made of the same material can in many cases be used to measure both corrosive rates and erosive rates is fortunate since sometimes an environment or atmosphere will have both corrosive and erosive properties. Accordingly, modifications are contemplated which may be made without departing from the spirit of the described invention or of the scope of the appended claims.

What is claimed is:

1. A corrosion rate measuring apparatus comprising a circular frame having a circumferential notch in the upper surface thereof, a corrodible helical spring positioned in said notch and supported by said frame, said spring being made of such material that it will lose measurable resistance to compressive strength with time in a corrosive environment, a cylindrical weight having a circumferential notch in the lower surface thereof and an axial opening therethrough, said weight being supported by said spring the upper end of which is positioned in the notch of said weight, a scale attached to said frame, said scale projecting axially through said spring and said weight, and a zero adjust means attached to said scale above said weight, said scale and weight cooperating to produce differing relative positions, over periods of time, which are indicative of the corrosion rates for said periods of time.

2. A corrosion rate measuring apparatus comprising a frame, a corrodible helical spring supported by and depending from said frame, said spring being made of such material that it will lose measurable tensile strength when placed in a corrosive environment, a weight having an axial opening therethrough supported by said spring in such a fashion that said spring is put in tensile stress by said weight, and a scale rigidly attached to said frame, said scale projecting axially through said spring and said weight, said scale and weight cooperating to produce differing relative positions, over periods of time, which are indicative of the corrosion rates for said periods of time.

References Cited by the Examiner
UNITED STATES PATENTS

| 2,049,644 | 8/36 | Essen | 73—161 |
| 2,164,453 | 7/39 | Gaskins | 73—161 |
| 2,568,596 | 9/51 | Ruge | 73—161 |

RICHARD C. QUEISSER, *Primary Examiner.*